US006717790B1

(12) United States Patent
Morooka

(10) Patent No.: US 6,717,790 B1
(45) Date of Patent: Apr. 6, 2004

(54) CREEPING DISCHARGE LIGHTNING PROTECTION DEVICE

(75) Inventor: Yasunari Morooka, Fukuoka (JP)

(73) Assignee: Kyushu Electric Power Co., Inc., Fukuoka (JP)

( * ) Notice: Subject to any disclaimer, the term of this patent is extended or adjusted under 35 U.S.C. 154(b) by 0 days.

(21) Appl. No.: 09/744,066

(22) PCT Filed: May 23, 2000

(86) PCT No.: PCT/JP00/03286

§ 371 (c)(1),
(2), (4) Date: Mar. 12, 2001

(87) PCT Pub. No.: WO00/72417

PCT Pub. Date: Nov. 30, 2000

(30) Foreign Application Priority Data

May 25, 1999 (JP) .......................................... 11/145634

(51) Int. Cl.[7] .................................................. H02H 1/00
(52) U.S. Cl. ....................................................... 361/117
(58) Field of Search ................................ 361/111, 117, 361/118, 120; 174/4 R, 5 R, 140 R, 142, 144, 140 C, 140 H, 140 CR, 140 S, 141 R

(56) References Cited

U.S. PATENT DOCUMENTS

| | | | | |
|---|---|---|---|---|
| 978,959 A | * | 12/1910 | Thomas | 361/120 |
| 6,108,187 A | * | 8/2000 | Podporkin et al. | 361/117 |
| 6,504,092 B1 | * | 1/2003 | Morooka | 174/40 R |

* cited by examiner

*Primary Examiner*—Ronald W. Leja
(74) *Attorney, Agent, or Firm*—Jordan and Hamburg LLP

(57) ABSTRACT

A lightening countermeasure for overhead power lines guards against breaking of wire and momentary service interruption without using any ZnO device. A lightening arrester body for an overhead power line includes a double-folded insulated wire which is insulated to a same extent as that of a power cable. A conductor-exposed side of the lightening arrester body is connected to an insulator-earthing side, and an insulating cover side is disposed on a discharge electrode side provided to an overhead power line. A needle electrode of the discharge electrode penetrates the insulating cover of the overhead power line. Where the overhead power line is bare wire, the conductor-exposed side of the arrester body is connected to the insulator-earthing side, and the insulator cover side is connected to the overhead power line.

8 Claims, 11 Drawing Sheets

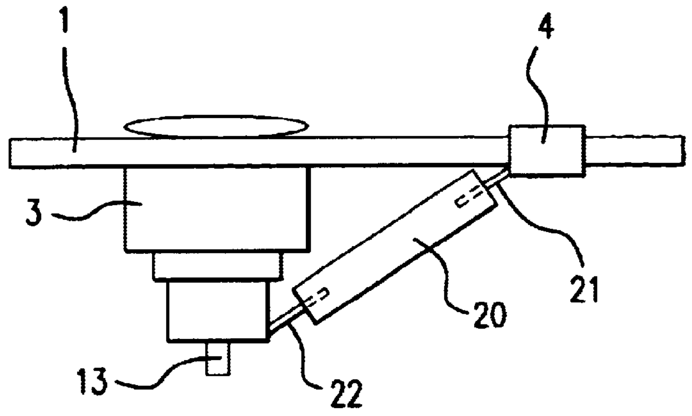
FIG. 11
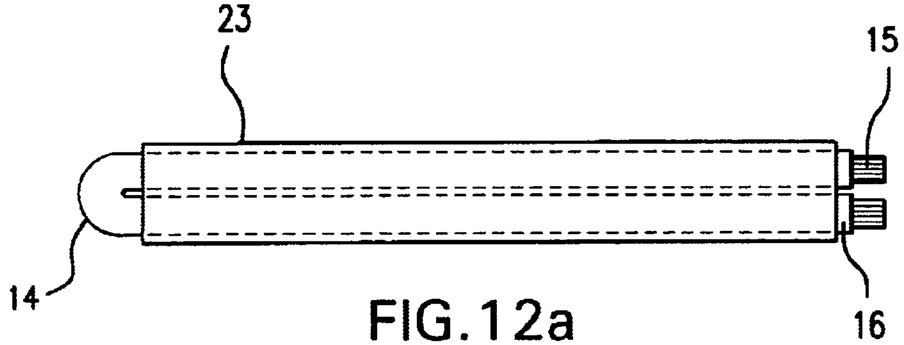
FIG. 12a
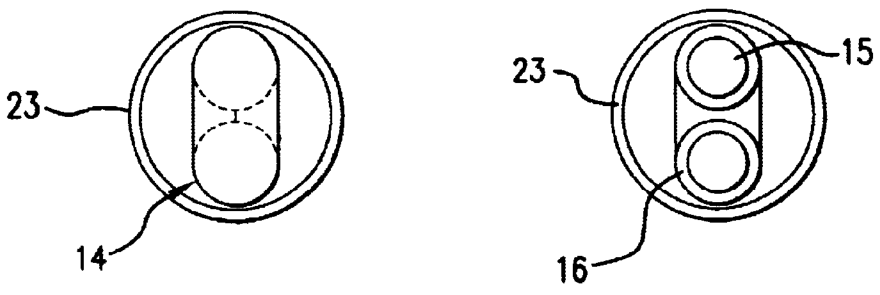
FIG. 12b
FIG. 12c

CREEPING DISCHARGE LIGHTNING PROTECTION DEVICE

TECHNICAL FIELD

The present invention relates to a creeping discharge lightning protection device (arrestor) for preventing breaking of insulated wire and momentary service interruption of power system due to lightning surge arising close on supporting insulator in overhead power lines.

BACKGROUND ART

A breaking of insulated wire typically rises out of a mechanism such that a lightning surge first causes the destruction of an insulating sheath adjacent a supporting insulation, an AC dynamic then being caused by a flashover in a multiple-phase power line, this AC short-circuit current then passing regionally through the damaged portion via an metallic arm securing the supporting insulation, and a conductor layer of the insulated wire eventually being evaporated or broken by a heat caused by arcing. A momentary service interruption of a power system arises from a continuous earth current due to a flashover in the supporting insulation by the lightning surge. For preventing the breaking and momentary service interruption, it is important to interrupt the AC short-circuit current and earth current caused along a discharging path formed by the lightning surge.

Currently, a ZnO element is installed as a most typical measure to prevent the breaking and the momentary service interruption.

However, a great deal of expenditure is required to install a ZnO element. This approach may be not a perfect measure because the ZnO element tents to be burnt out by a direct hit of lightning to an overhead power line.

DISCLOSURE OF INVENTION

Therefore, it is an object of the present invention to provide a low-cost measure for preventing the breaking and the momentary service interruption without the use of the ZnO element so as to reduce the cost of measures for lightning in overhead power lines.

In order to achieve the above object, the present invention provides a creeping discharge lightning protection device in an overhead power line formed of a insulating wire or a bare wire, the creeping discharge lightning protection device comprising a lightning protection device body formed of an insulated wire insulated to the same extent as a power cable and folded into two, the lightning protection device body including an exposed conductor portion and an insulating sheath portion, wherein either one of the exposed conductor portion and the insulating sheath portion is connected to an earth portion of an insulator. Further, in case that the overhead power line is formed of the insulating wire, another one of the exposed conductor portion and the insulating sheath portion is connected to a discharge electrode, wherein the discharge electrode includes a needle electrode which penetrates an insulating sheath of the overhead power line so as to bring about through-breakdown. In case that the overhead power line is formed of the bare wire, another one of the exposed conductor portion and the insulating sheath portion being arranged directly to the overhead power line.

The present invention also provides a creeping discharge lightning protection device in an overhead power line formed of a insulating wire or bare wire, the creeping discharge lightning protection device comprising a lightning protection device body having either one of an insulating layer including a back electrode so as to enhance flashover performance, an insulating tube the one end or both ends of which are opened around a flashover path so as to enhance arc-suppression performance, and combinations thereof so as to enhance flashover performance and arc-suppression performance, wherein the lightning protection device body is positioned between the overhead power line and an earth portion of an insulator.

BRIEF DESCRIPTION OF DRAWINGS

FIG. 11 is a schematic view showing a second embodiment of the present invention;

FIG. 12(*a*) is a schematic view showing a third embodiment of the present invention;

FIG. 12(*b*) is a left side view of the third embodiment;

FIG. 12(*c*) is a right side view of the third embodiment;

FIG. 13(*b*) is a left side view of the fourth embodiment;

FIG. 13(*c*) is a right side view of the fourth embodiment;

FIG. 14(*b*) is a left side view of the fifth embodiment;

FIG. 14(*c*) is a right side view of the fifth embodiment; and

BEST MODE FOR CARRYING OUT THE INVENTION

Mode of embodiment of the present invention will now be described.

Upon lightning stroke, only lightning impulse voltage was discharged in a given distance on the surface of a lightning protection device, and an AC current was blocked off to prevent the breaking and the momentary service interruption. After checking out an AC current blocking characteristic, a discharge characteristic of the lightning protection device and an insulator, an affect on a creeping discharge characteristic by difference in polarity of lightning impulse voltage and its measures, and a required thickness of an insulation cover, a new creeping discharge lightning protection device has been invented in consideration of feasibility, i.e. economical efficiency, working property and the like.

According to one aspect of the present invention, a creeping discharge lightning protection device has a feature to allow a discharge in the surface of the lightning protection device to be occurred earlier than that of an insulator by effect of a back electrode. In addition, a space sandwiched by an insulated wire has a structure less subject to an electric field to the earth so that polar effect to creeping discharge may be reduced and thereby discharge characteristic may be enhanced.

In a creeping discharge lightning protection device according to a second aspect of the present invention, a discharge is yielded within a tube to increase the pressure in the tube, and a gas inside the tube is discharged from one open end or both open ends of the tube. This enables to enhance the AC arc-suppression performance and shorten the required gap length. Thus, upon lightning stroke, the discharge in the tube can be occurred earlier than that of the insulator.

According to a third aspect of the present invention, a creeping discharge lightning protection device has a feature to achieve an improved lighting protection performance and a compact structure by yielding some discharge of a back electrode within a tube to enhance the creeping discharge characteristic and AC arc-suppression performance. This lightning arrester may include a back electrode having a tubular shape less subject to an electric field to the earth so that the polar effect of creeping discharge may further be reduced.

1. Outline of Test

Figure 1:
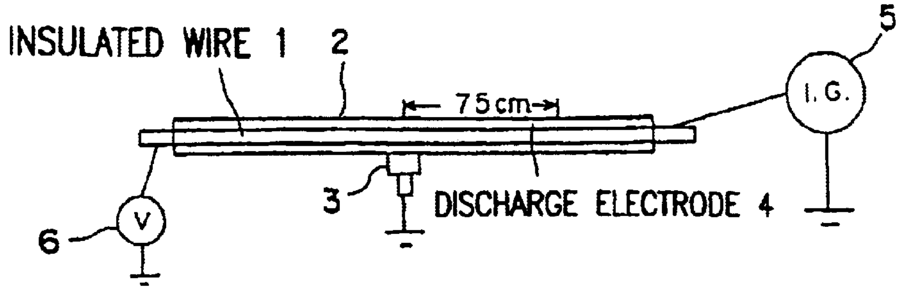
FIG. 1 is a schematic view of a test device for checking out creeping discharge characteristics.

A test was performed to determine an insulation performance of an insulated wire and an insulating tube, and a discharge voltage caused by creeping discharge. An outline of test device is shown in FIG. 1. The insulated wire 1 with a cover 2 was supported by a pin insulator 3, and both were secured to each other by a copper band of 1.2 mm in diameter. A discharge electrode 4 was provided by putting in a nail at a portion spaced by 75 cm from this secured position. A lightning impulse voltage (1.2/50 $\mu$s) was applied to one end of the insulated wire 1 with varying its peak vale. At this time, a voltage (discharge voltage) arising between the insulated wire and the earth in addition to a time to creeping discharge or through-breakdown was measured by a voltmeter 6. When a characteristic of the insulated wire itself was checked out (without the insulator), the test was performed with short-circuiting the insulator 3 by a copper band. When an insulating performance of the insulating sheath itself was checked out, the test was performed with providing no nail not to make creeping discharge arise.

2. Test Result

Figure 2:
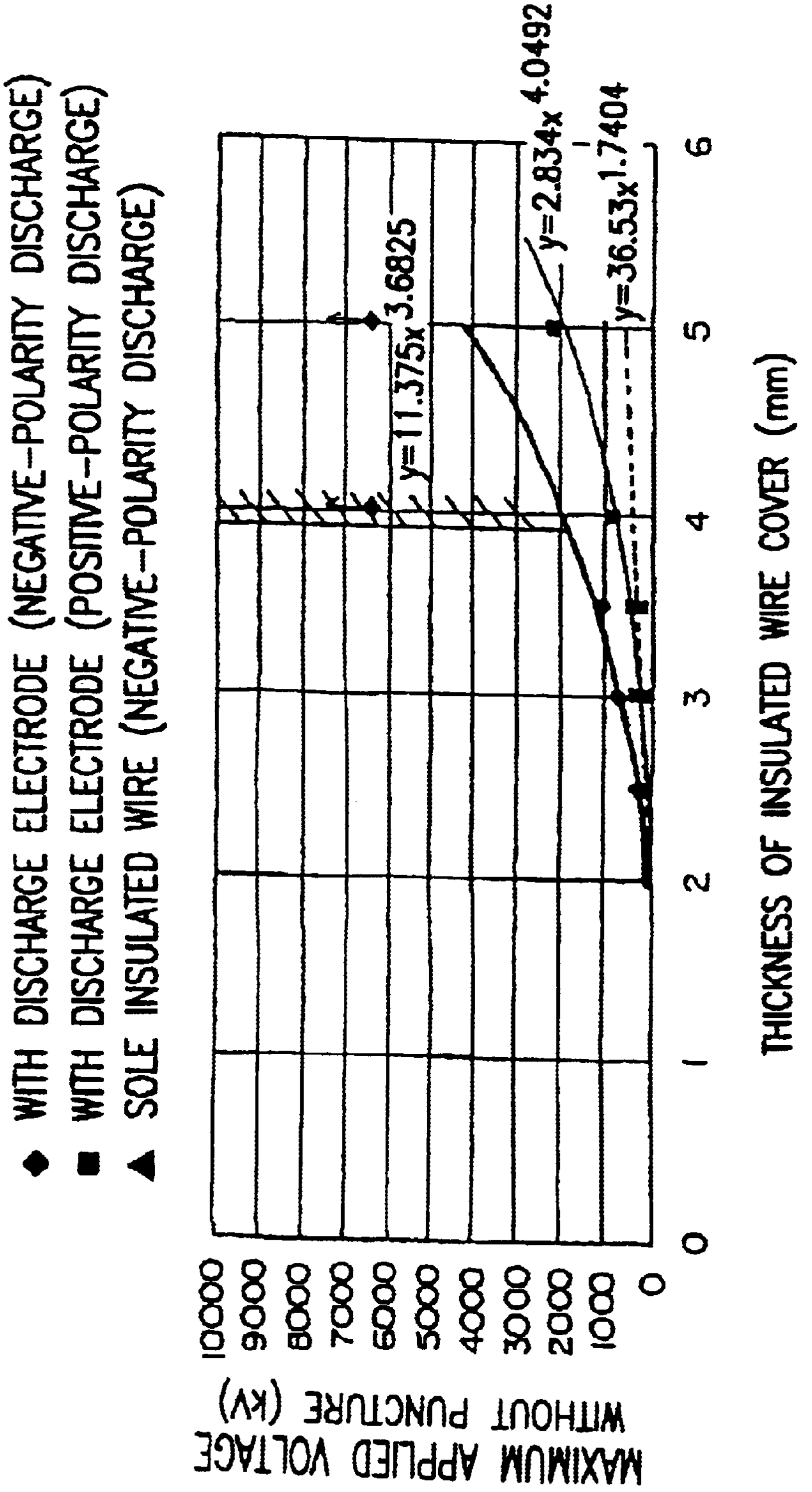
FIG. 2 is a characteristic diagram showing a relationship between thickness of sheath and maximum applied voltage not to bring about through-breakdown.
Figure 3:
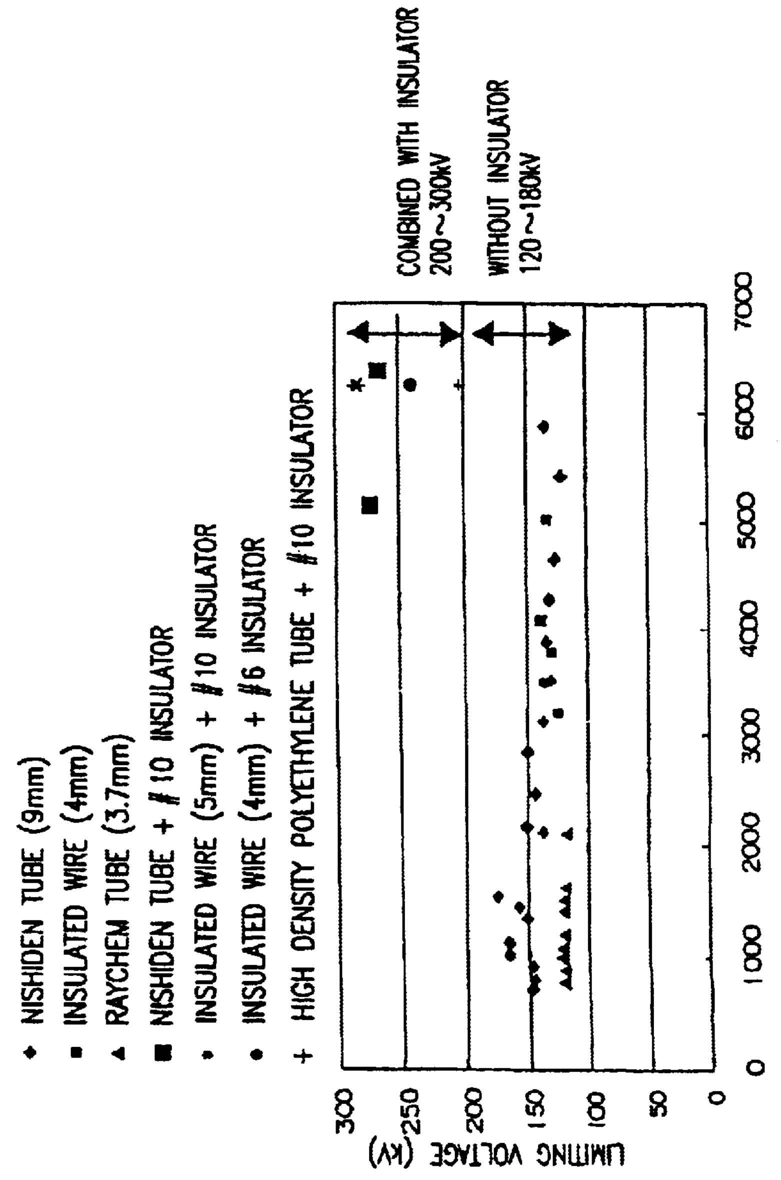
FIG. 3 is a characteristic diagram showing a relationship between applied voltage and discharge voltage.

FIG. 2 shows a relationship between a thickness of the insulating sheath and a maximum applied voltage not to bring about through-breakdown in the insulating sheath, for both cases that only the insulated wire was provided and the creeping discharge electrode was additionally provided. From FIG. 2, when the creeping discharge electrode was additionally provided, higher voltage may be applied as compared to the case of the insulated wire itself. This proves that the creeping discharge limits the voltage acted upon the insulating sheath. It is also proved that this effect is noticeable in larger thickness of the insulating sheath and in a negative polarity of voltage (the voltage makes the conductor of the insulated wire have a negative pole and makes the earth side have a positive pole). When the negative polarity of voltage was applied, the maximum applied voltage was exponentially increased at 4 mm or more thickness of the insulating sheath and the through-breakdown did not arise even at 6,200 kV of applied voltage. FIG. 3 shows a discharge voltage of the insulating sheath in creeping discharge. In respect that the discharge voltage is dispersed in the range of 120 to 180 kV regardless of the applied voltage when the insulator is not combined, it may be understood with high possibility that the insulated wire having a particular level of insulating performance arises no through-breakdown even if the applied voltage is increased. The discharge voltage is dispersed in the range of 200 to 300 kV when the insulator is combined. This may be caused by the extended time to creeping discharge due to the combined insulator and the increased voltage acting upon the insulating sheath during this extended time.

Figure 4:
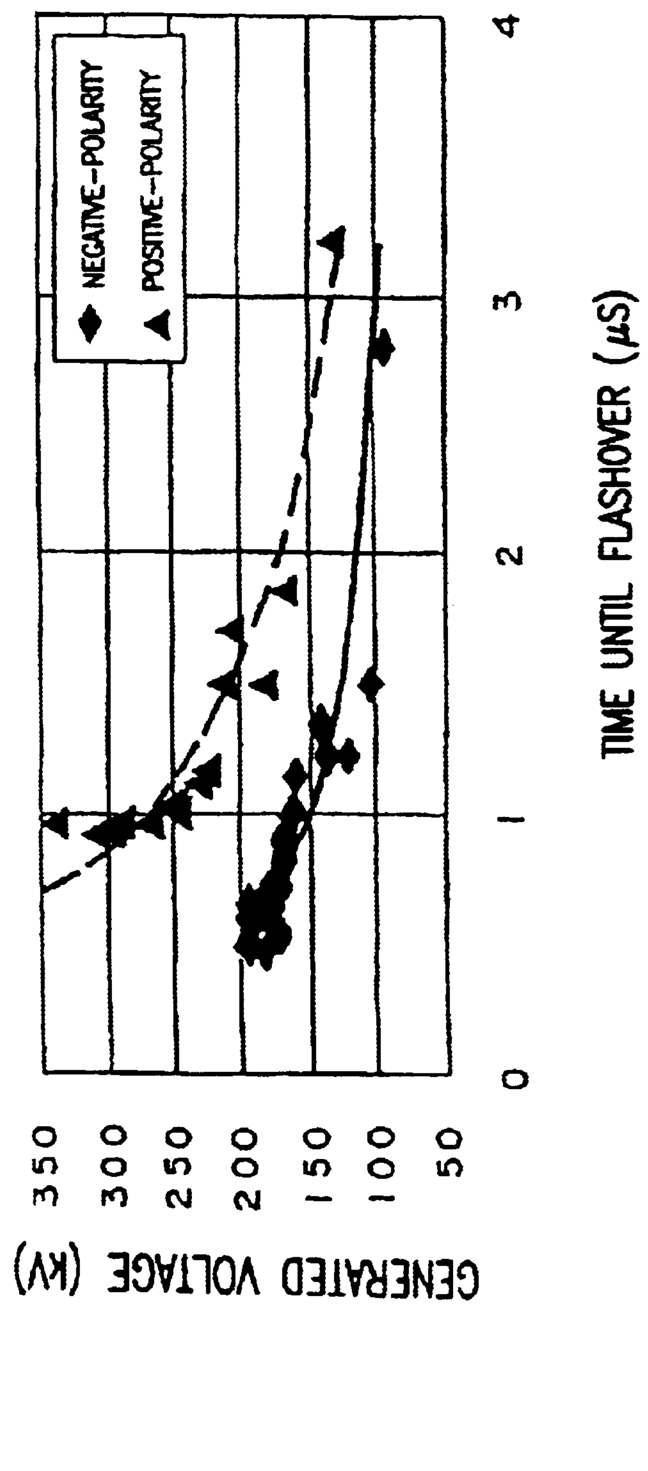
FIG. 4 is a characteristic diagram showing a relationship between voltage and time of creeping discharge.
Figure 5:
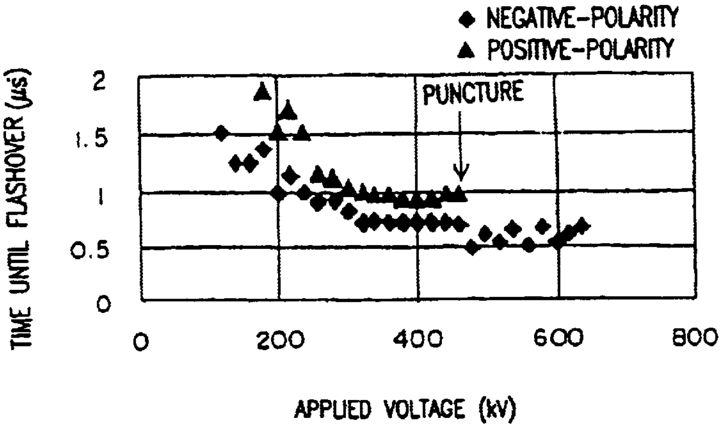
FIG. 5 is a diagram showing a relationship between applied voltage and time to flashover.

In order to check the affect of polarity of applied voltage in creeping discharge, a voltage—time characteristic of creeping discharge (FIG. 4) and a relationship between applied voltage and time to flashover (FIG. 5) were determined. It is proved that the positive polarity causes considerably higher voltage than that of the negative polarity (FIG. 4).

Since the time to flashover in the positive polarity is longer than that in the negative polarity (FIG. 5), It may be supposed that the creeping discharge in the positive polarity cannot be smoothly formed than that in the negative polarity. Thus, it is understood that the positive polarity of creeping discharge causes higher discharge voltage due to longer time to flashover (FIG. 4), resulting in lower maximum applied voltage (FIG. 2).

In view of practical applications, this affect cannot be ignored. Thus, two techniques has been invented to settle the affect of the polarity, and their advantage has also been confirmed through a test. In the positive polarity of creeping discharge, the electric field on the surface of the insulated wire is modified because free electrons in space is constrained due to the affect of electric field on the surface of the insulated wire and cannot contribute to develop creeping discharge.

<A First Test Example>

Figure 6:
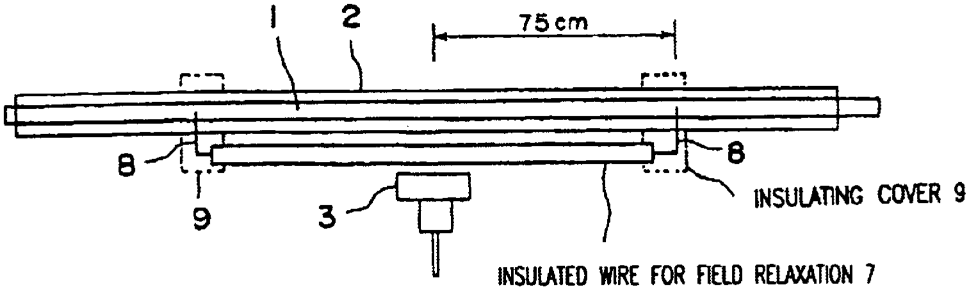
FIG. 6 is a sectional view showing a first test example of the present invention.

FIG. 6 is a sectional view showing a construction of the first test example. An insulated wire 7 for modifying electric field is positioned close to the insulated wire 1 between the insulated wire 1 and the earth. Each conductor portion 8 located in the both ends of the insulated wire 7 for modifying electric field is connected to the conductor of the insulated wire 1 at the position spaced by 75 cm from the insulator 3 and is insulated by an insulating cover 9.

<A Second Test Example>

Figure 7:
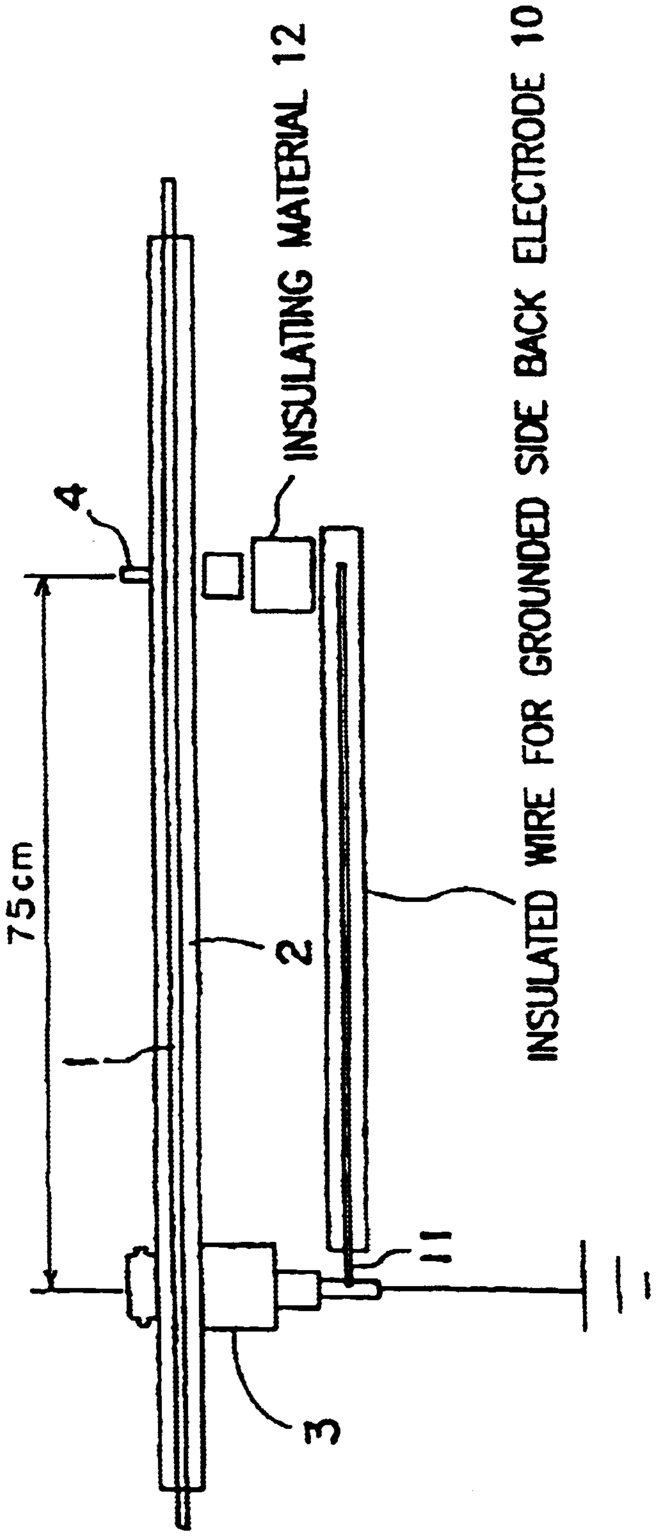
FIG. 7 is a sectional view showing a second test example of the present invention.

FIG. 7 is a sectional view showing a construction of the second test example. An insulated wire 10 for an earth side back electrode is positioned on the earth side with respect to the insulated wire 1. A conductor portion 11 located in one end of the insulated wire 10 and having an un-insulated conductor is connected to an earth terminal of the insulator 3, while an insulated portion 12 located in another end of the insulated wire 10 and having an insulated conductor is insulated to the insulated wire 1 by an insulating member 12.

Figure 8:
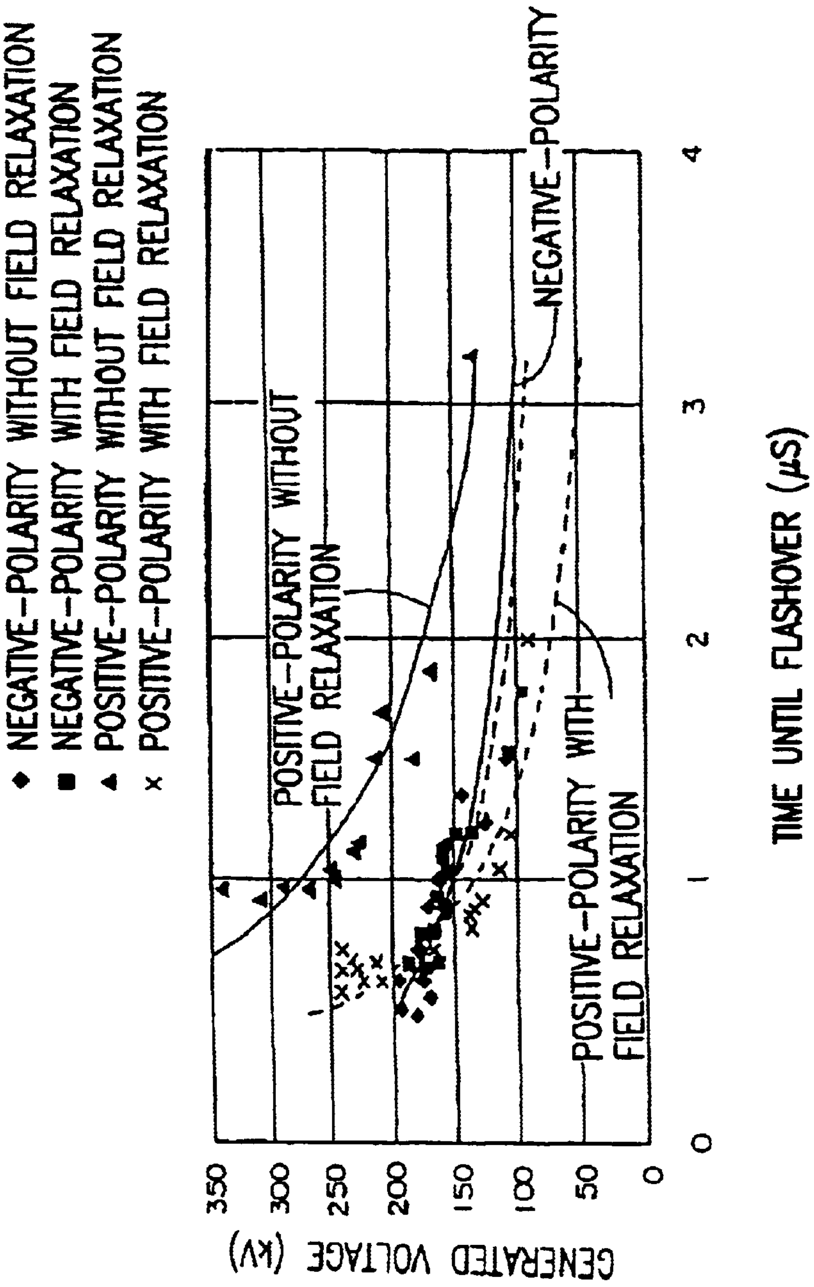
FIG. 8 is a characteristic diagram showing a relationship between voltage and time of creeping discharge.

As shown in FIG. 8, according to the technique using the insulated wire 7 for modifying electric field, even in the positive polarity of creeping discharge, a voltage-time characteristic can be improved to show a similar to that in the negative polarity of creeping discharge so as to facilitate creeping discharge. According to the technique using the insulated wire 10 for an earth side back electrode, the flashover arises on the surface of the insulated wire 1 (main line) upon applying the negative polarity of voltage, while the flashover arises on the surface of the insulated wire 10 for an earth side back electrode upon applying the positive polarity of voltage. As a result, 4 mm of the insulated wire which has otherwise arisen through-breakdown at 854 kV upon applying the positive polarity of voltage does not arise through-breakdown even if applying the positive polarity of voltage 6,200 kV as well as the case of the negative polarity of voltage.

<Direct Lighting Stroke Test with Actual Scale Simulated Distribution Line>

The technique of the present invention was applied to the simulated distribution line. Then, a lightning impulse heave—current (maximum current value 17 kA, 1.5/11 $\mu$s) generated by a large impulse generator (maximum generating voltage 12 MV) was applied to confirm whether creeping discharge can be formed over a required distance (75 cm).

The test result is shown in Table 1.

(2) Using the technique to solve the problem on the polarity of lightning, a required thickness can be reduced to 3 mm or more of sheath thickness of the insulated wire in the case with overhead earth-wire, and to 4 mm or more of insulation thickness of power cable in the case without overhead earth-wire.

<Embodiment>

Figure 9:
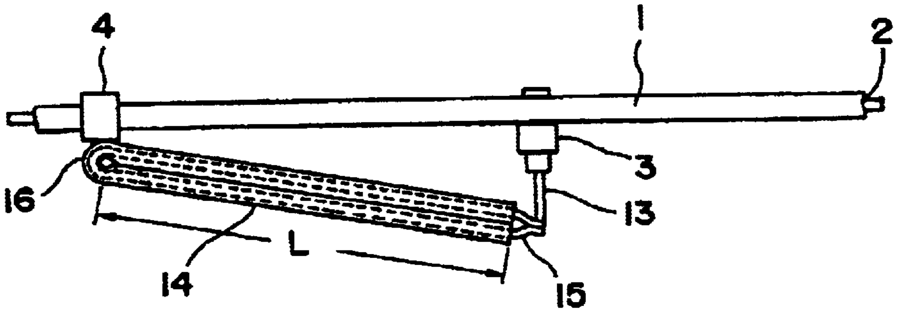
FIG. 9 is a schematic view showing a first embodiment of the present invention.
Figure 10:
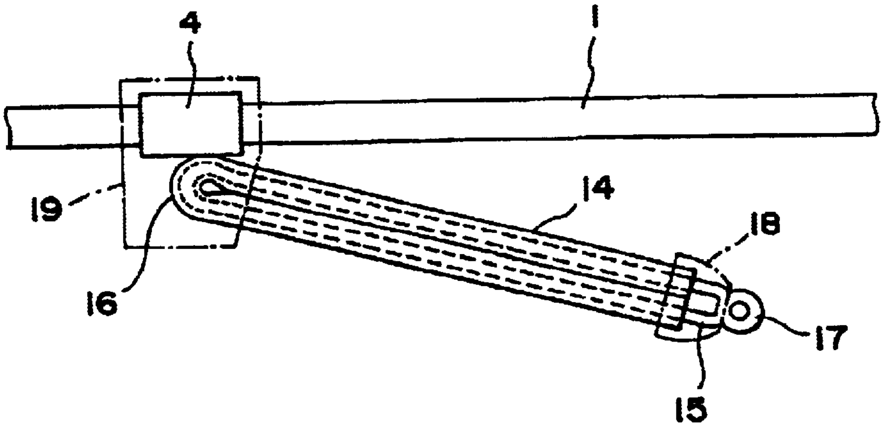
FIG. 10 is a detail view showing the first embodiment of the present invention.

Embodiments of the present invention will now be described. FIG. 9 shows a structure of one embodiment of a creeping discharge arrester according to the present invention, and FIG. 10 shows its detail (in both cases, an overhead power line is an insulated wire). In the drawings, the reference number 1 indicates an insulated wire, the reference number 2 indicating a sheath, the reference number 3 indicating a pin insulator, the reference number 4 indicating a discharge electrode, the reference number 13 indicating a bolt portion (high voltage arm) of the pin insulator 3, the reference number 14 indicating a lightning protection device body, the reference number 15 indicating exposed conductor portions, the reference number 16 indicating an insulation sheath portion, the reference number 17 indicating a splicing fitting for connecting the exposed conductor portions mutually, the reference number 18 indicating a reinforcing cover for preventing a fatigue breaking of the exposed conductors portions 15, and the reference

TABLE 1

| Tested Unit | | With overhead ground wire Lightening impulse point: Top of pole | | | | | | Without overhead ground wire Lightening impulse point: Top of pole | | | | | | Without overhead ground wire Lightening impulse point: Power line | | | | | |
|---|---|---|---|---|---|---|---|---|---|---|---|---|---|---|---|---|---|---|---|
| Insulator | | Positive Polarity | | | Negative Polarity | | | Positive Polarity | | | Negative Polarity | | | Positive Polarity | | | Negative Polarity | | |
| Withstand Voltage | Wire | Pole Body | 100 Ω | 50 Ω | Pole Body | 100 Ω | 50 Ω | Pole Body | 100 Ω | 50 Ω | Pole Body | 100 Ω | 50 Ω | Pole Body | 100 Ω | 50 Ω | Pole Body | 100 Ω | 50 Ω |
| 90 kV | Cable 6 mm | ○ | ○ | ○ | ○ | ○ | ○ | ○ | ○ | ○ | ○ | ○ | ○ | ○ | ○ | ○ | ○ | ○ | ○ |
| 60 kV | Cable 4 mm | ○ | ○ | ○ | ○ | ○ | ○ | ○ | ○ | ○ | X | X | ○ | X☆ | X | ○ | ○ | ○ | |
| 20 kV | OE- 5 mm | ○ | ○ | ○ | X | X | X | ○ | ○ | ○ | X | X | X | X | X | X | X | X | X |
| | OE- 4 mm | ○ | ○ | ○ | X | X | X | ○ | ○ | ○ | X | X | X | X | X | X | X | X | X |
| | OC- 3.5 mm | ○ | ○ | ○ | X | X | X | ○ | ○ | ○ | X | X | X | X | X | X | X | X | X |
| | OC- 3.0 mm | ○ | ○ | ○ | X* | X | X | X | X | X | X | X | X | X | X | X | X | X | X |
| | OE- 2.5 mm | X | X | X | X | X | X | X | X | X | X | X | X | X | X | X | X | X | X |
| | OE- 2 mm | X | X | X | X | X | X | X | X | X | X | X | X | X | X | X | X | X | X |

○: non-puncture (creeping discharge)
X: puncture
*: non-puncture by using grounded side back electrode
☆: non-puncture by using insulated wire for field relaxation From this test result, with respect to a required insulation thickness for 75 cm of creeping discharge, the following facts can be remarked in case of the lightning stroke having about 17 kA of lightning impulse current peak value (occurrence frequency: about 30%).

(1) In the case with overhead earth-wire, a creeping discharge can be formed without through-breakdown by 4 mm or more of insulation thickness of power cable. In the case without overhead earth-wire, a creeping discharge can be formed without through-breakdown by 6 mm or more of insulation thickness of power cable number 19 indicating an insulating/retaining cover for retaining the discharge electrode 4 and the insulation sheath portion 16 and reinforcing these portions.

The lightning protection device body 14 is formed of an insulated wire insulated to the same extent as a power cable and is folded into two. Thus, the exposed conductor portions 15 locate at one end of the insulated wire and have exposed conductors, while the insulating sheath portion 16 locates at another end of the insulated wire and is insulated. Two of the exposed conductor portions 15 are connected and united by the splicing fitting 17, and are connected to an earth side, e.g. the bolt portion 13, of the pin insulator 3. The insulating sheath portion 16 is secured to the discharge electrode 4 mounted on the insulated wire 1 by the insulating/retaining cover 19. At this time, an insulated wire 1 is penetrated by a needle electrode of the discharge electrode 4 so as to bring about through-breakdown in advance, In this embodiment, when a lightning over-current occurs at the insulated wire 1, a flashover arises on the surface of a creeping discharge type of the lightning protection device body 1 disposed between the discharge electrode 4 and the bolt portion (high voltage arm) of the pin insulator 3. However, since an AC short-circuit is not induced, any breaking of the insulated wire and momentary service interruption never arise.

While the overhead earth-wire is the insulated wire in the embodiment in FIGS. 9 and 10, if the overhead earth-wire is a bare wire, the insulating sheath portion 16 of the lightning arrester 14 is positioned directly on the overhead earth-wire.

FIG. 11 shows a second embodiment, in which a discharge electrode is provided at both end of an insulating tube 20 the one or both ends of which are opened. One discharge electrode 21 is connected to the discharge electrode 4 mounted on the insulated wire 1, while another discharge electrode 22 is connected to the bolt portion 13 of the pin insulator 3.

In the lightning protection device of the second embodiment, a discharge is yielded within the tube 20 to increase the pressure in the tube 20, and a gas inside the tube is discharged from one open end or both open ends of the tube. This enables to enhance the AC arc-suppression performance and shorten the required gap length. Thus, upon lightning stroke, the discharge in the tube 20 can be occurred earlier than that of the insulator.

FIG. 12 shows a third embodiment, in which an insulating tube 23, the one end or both ends of which are opened, covers outside the creeping discharge lightning protection device body 14 of the first embodiment of FIGS. 9 and 10. As is the case with the first embodiment, one end of the lightning protection device body 14 is connected to the overhead power line (e.g. the insulated wire 1), while another end thereof is connected to the earth side (e.g. the bolt portion 13) of the pin insulator 3.

Figure 13A:
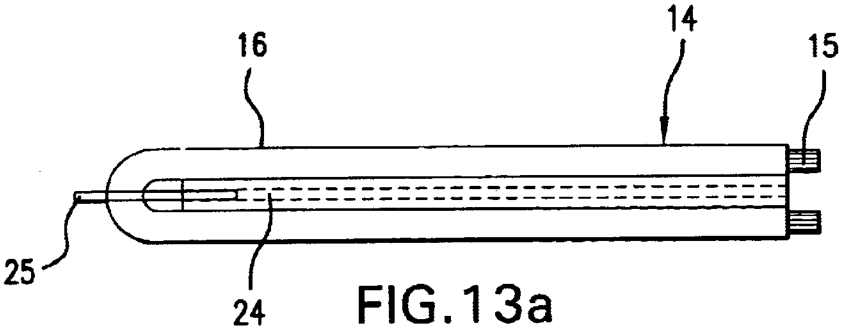
FIG. 13(*a*) is a schematic view showing a fourth embodiment of the present invention.
Figure 13B:
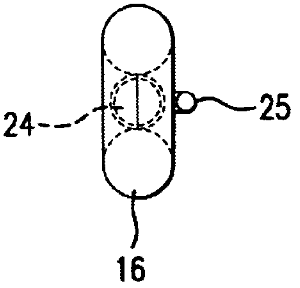
Figure 13C:
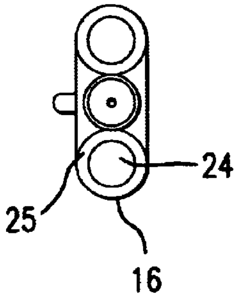

FIG. 13 shows a fourth embodiment, in which an insulating tube 24, the one end or both ends of which are opened, is sandwiched by the insulated wire of the creeping discharge lightning protection device body 14 of the first embodiment so as to positioned the insulating tube 24 on the inside of the insulated wire of the creeping discharge lightning protection device body 14, and an electrode 25 to be connected to the overhead power line is inserted into one open end of the insulating tube 24 located on the side of the insulating sheath 16. As is the case with the first embodiment, one end of the lightning protection device body 14 is connected to the overhead power line (e.g. the insulated wire 1), while another end thereof is connected to the earth side (e.g. the bolt portion 13) of the pin insulator 3.

Figure 14A:
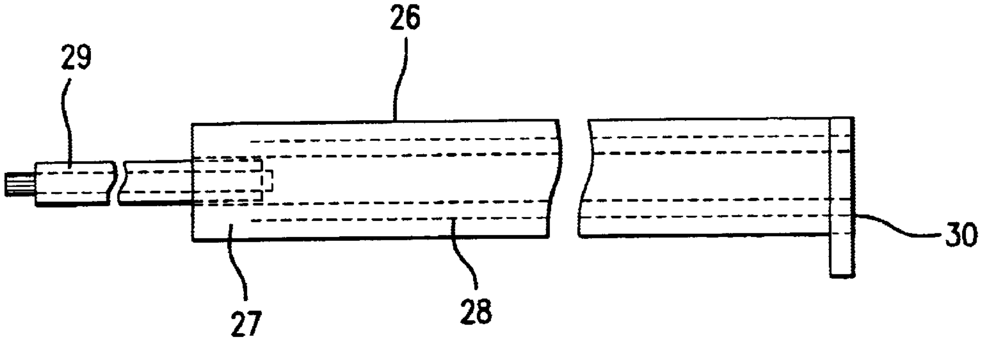
FIG. 14(*a*) is a schematic view showing a fifth embodiment of the present invention.
Figure 14B:
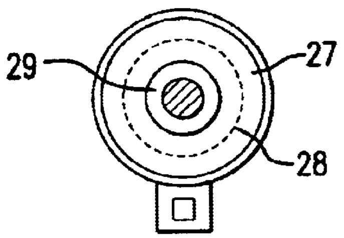
Figure 14C:
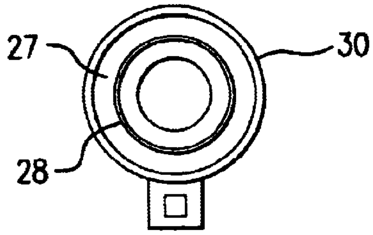

FIG. 14 shows a fifth embodiment, in which a back electrode 28 is provided inside or within an insulating layer 27 of an insulating tube 26, the back electrode 28 being sufficiently insulated at one end of the insulating tube 26 and exposed at another of the insulating tube 26, an electrode 29 to be connected to the overhead power line being inserted into the one end the insulating tube 26 which insulates the back electrode 28, an electrode 30 to be earthed being provided at the another end of the insulating tube 26 which exposes the back electrode 28 and also being connected to the back electrode 28, the electrode 29 being connected to the overhead power line, and the electrode 30 being connected to an earth side of an insulator 30.

According to the second to fifth embodiments, there is provided a feature to achieve an improved lighting protection performance and a compact structure by yielding some discharge of the back electrode within the tube to enhance the creeping discharge characteristic and AC arc-suppression performance. Particularly, in the lightning protection device of the fifth embodiment, the back electrode has a tubular shape less subject to an electric field to the earth so that an affect of a polar effect of creeping discharge may further be reduced.

(1) Maximum Value of Gap Length ($L_{gmax}$)

In a direct lightning stroke having 17 kA of lightning impulse current to the main wire, the maximum value of gap length not to make the pin insulator spark over is determined.

TABLE 2

| Thickness of the Insulating tube | No.6 insulation (Withstand voltage of insulator: 60 kV) Positive polarity | No.6 insulation Negative polarity | No.10 insulation (Withstand voltage of insulator: 90 kV) Positive polarity | No.10 insulation Negative polarity |
|---|---|---|---|---|
| 2 mm | 40 cm | 50 cm | — | — |
| 4 mm | 30 cm | 45 cm | 50 cm | 50 cm |
| 6 mm | 30 cm | 45 cm | — | — |
| 8 mm | 25 cm | 35 cm | — | — |

—: no test

From this test results, considering that No.6 insulator should be protected and the thickness of the insulating tube should be 6 mm or less, $L_{gmax}$ is set in 30 cm.

(2) Inside Diameter of Tube and Minimum Value of Gap Length ($L_{gmin}$)

An affect of inside diameter of tube was checked on. The test was performed with 1 m of tube the both end of which are opened. Test piece: EPR 4.8 ϕ, glass 6 ϕ, chloroethene 12 ϕ, acrylic 18 ϕ.

Figure 15:
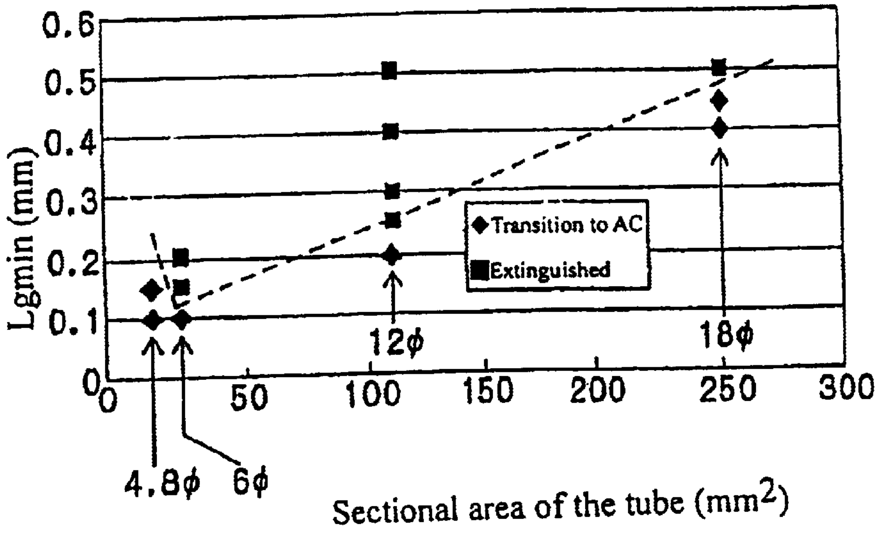
FIG. 15 is a diagram showing a relationship between the sectional area of a tube and the minimum value of gap length.

The result is shown in FIG. 15.

From the result of FIG. 15, it is proved that $L_{gmin}$ becomes longer in direct proportion to the sectional area of the tube in the range of 6 ϕ or more of inside diameter, and $L_{gmin}$ becomes longer as the inside diameter is small (4.8 ϕ).

(3) Condition in Transition to AC

The condition in the transition to AC was observed. Even in the transition to AC (12 ϕ, gap length 25 cm), an arc caused by short-circuit current is suppresses within a half wave and thus have few affect to the system. An excellent force line charging can also be obtained, and it may be judged that any problem of power supply will be free from care even in the failure of lightning protection, because an arc caused by re-lightning stroke can be suppresses within a half wave.

As described above, the present invention provides the following advantages.

(1) Since the breakdown voltage of the creeping discharge lightning protection device is lower than that of the insulator, it is not in association with the insulation performance of overhead power line. (It is possible to device a countermeasure to any existing equipment.)

(2) The discharge voltage can be limited lower because of the structure not to be combined with insulators. (Supposedly, the discharge voltage is equal to or less than that of No.10 insulation.)

(3) By arranging two insulated wires along each other, there is provide a space having modified electric field on the surface of aerial line so that stable flashover can be generated regardless the polarity of lightning over-current caused in the overhead power line.

(4) This device can be applied not only to path portion but also arresting portion.

(5) An excellent working property is provided to mount this device.

(6) By thinning the conductor located inside the creeping discharge lightning protection device and using it as a fuse, the AC dynamic current can be blocked even in failure of creeping discharge (through breakdown).

(7) The cost for measures to lightning protection can be reduced more than that of ZnO.

(8) Free from the limited amount of resistance against discharge as in ZnO.

INDUSTRIAL APPLICABILITY

The present invention can be utilized in a creeping discharge lightning protection device for preventing breaking of insulated wire and momentary service interruption of power system due to lightning surge arising close on supporting insulator in overhead power lines.

What is claimed is:

1. In an overhead power line formed of an insulating wire, a creeping discharge lightning protection device comprising a lightning protection device body formed of an insulated wire insulated to a same extent as a power cable and folded into two, said lightning protection device body including an exposed conductor portion and insulating sheath portion, a one of said exposed conductor portion and said insulating sheath portion being connected to an earth portion of an insulator, and another one of said exposed conductor portion and said insulating sheath portion being connected to a discharge electrode provided at said overhead power line, said discharge electrode including a needle electrode which penetrates an insulating sheath of said overhead power line.

2. In an overhead power line formed of a bare wire, a creeping discharge lightning protection device comprising a lightning protection device body formed of an insulated wire insulated to a same extent as a power cable and folded into two such that length portions thereof formed thereby overlay one another in close proximity, said lightning protection device body including an exposed conductor portion and insulating sheath portion, a one of said exposed conductor portion and said insulating sheath portion being connected to an earth portion of an insulator, and another one of said exposed conductor portion and said insulating sheath portion being connected to said overhead power line.

3. A creeping discharge lightning protection device, comprising:

an insulating tube which is open at least one end of two ends thereof, a pair of discharge electrodes each being provided on a respective one of said two ends, a one of said discharge electrodes being connected to an overhead power line, and another one of said discharge electrodes being connected to an earth portion of an insulator.

4. A creeping discharge lightning protection device as defined in claim 1, further comprising an insulation tube which is open at least one end of two ends thereof, said insulation tube covering the outside of said creeping discharge lightning protection device, a one end of said lightning protection device being connected to said overhead power line, and another end of said lightning protection device being connected to said earth portion of said insulator.

5. A creeping lightning protection device as defined in claim 1, further comprising:

an insulation tube which is open at least one end of two ends thereof, said insulation tube being sandwiched between respective portions of said insulated wire of said creeping discharge lightning protection device folded in two; and an electrode inserted into an open one of said two ends of said insulation tube located on a side of said insulating sheath portion of said lightning protection device, a one end of said lightning protection device being connected to said overhead power line, and another end of said lightning protection device being connected to said earth portion of said insulator.

6. A creeping discharge lightning protection device comprising:

an insulation layer;

a back electrode provided inside said insulation layer;

an insulation tube the one end of which sufficiently insulates said back electrode and the another end of which exposes said back electrode;

an electrode to be connected to an overhead power line, which is inserted into said one end of said insulating tube insulating said back electrode; and an electrode to be earthed, which is provided at said another end of said insulating tube exposing said back electrode, and connected to said back electrode, wherein said electrode to be connected to said overhead power line is connected to said overhead power line, and said electrode to be earthed is connected to an earth portion of an insulator.

7. In an overhead power line formed of a bare wire, a creeping discharge lightning protection device comprising:

a lightning protection device body formed of an insulated wire insulated to a same extent as a power cable and folded into two, said lightning protection device body including an exposed conductor portion and insulating sheath portion, a one of said exposed conductor portion and said insulating sheath portion being connected to an earth portion of an insulator, and another one of said exposed conductor portion and said insulating sheath portion being connected to said overhead power line; and an insulation tube which is open at least one end of two ends thereof, said insulation tube covering the outside of said creeping discharge lightning protection device, a one end of said lightning protection device being connected to said overhead power line, and another end of said lightning protection device being connected to said earth portion of said insulator.

8. In an overhead power line formed of a bare wire, a creeping discharge lightning protection device comprising:

a lightning protection device body formed of an insulated wire insulated to a same extent as a power cable and folded into two, said lightning protection device body including an exposed conductor portion and insulating sheath portion, a one of said exposed conductor portion and said insulating sheath portion being connected to an earth portion of an insulator, and another one of said exposed conductor portion and said insulating sheath portion being connected to said overhead power line;

an insulation tube which is open at least one end of two ends thereof, said insulation tube being sandwiched between respective portions of said insulated wire of said creeping discharge lightning protection device folded in two; and an electrode inserted into an open one of said two ends of said insulation tube located on a side of said insulating sheath portion of said lightning protection device, a one end of said lightning protection device being connected to said overhead power line, and another end of said lightning protection device being connected to said earth portion of said insulator.

* * * * *